US008516370B2

(12) United States Patent
Duffie et al.

(10) Patent No.: US 8,516,370 B2
(45) Date of Patent: Aug. 20, 2013

(54) SESSION CLASSES FOR PROCESS AUTOMATION

(75) Inventors: Paul Kingston Duffie, Palo Alto, CA (US); Kevin Edward Oelze, Mountain View, CA (US); Adam James Bovill, San Francisco, CA (US); Pawan Kumar Singh, Sunnyvale, CA (US); Amish Jayeshbhai Patel, Fremont, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 570 days.

(21) Appl. No.: 12/714,396

(22) Filed: Feb. 26, 2010

(65) Prior Publication Data

US 2011/0214058 A1 Sep. 1, 2011

(51) Int. Cl.
 *G06F 3/00* (2006.01)
(52) U.S. Cl.
 USPC .......................................................... 715/704
(58) Field of Classification Search
 USPC .......................................................... 715/704
 See application file for complete search history.

(56) References Cited

U.S. PATENT DOCUMENTS

| 5,983,001 | A | 11/1999 | Boughner et al. |
| 7,461,342 | B2 | 12/2008 | McLean |
| 2006/0230319 | A1 | 10/2006 | Ryali et al. |
| 2008/0270841 | A1* | 10/2008 | Quilter ........................... 714/38 |
| 2009/0199096 | A1* | 8/2009 | Pop-Jordanov et al. ...... 715/704 |

OTHER PUBLICATIONS

International Search Report mailed Mar. 17, 2011 in SPIR 1044-2 (PCT/US11/21016), pp. 1-3.

* cited by examiner

*Primary Examiner* — Thanh Vu
(74) *Attorney, Agent, or Firm* — Haynes Beffel & Wolfeld LLP; Ernest J. Beffel, Jr.

(57) ABSTRACT

A script including a plurality of actions to process in a session associated with a system is generated via a user interface, where the script includes both actions and metaactions. The actions correspond to commands associated with the session to be executed on the system, and the metaactions correspond to a selected plurality of the commands. The script is generated by receiving the actions and the metaactions to process on the system via the user interface associated with the session for interfacing with the system, capturing the actions and the metaactions, and saving the captured actions and metaactions to generate the script.

16 Claims, 17 Drawing Sheets

FIG. 31

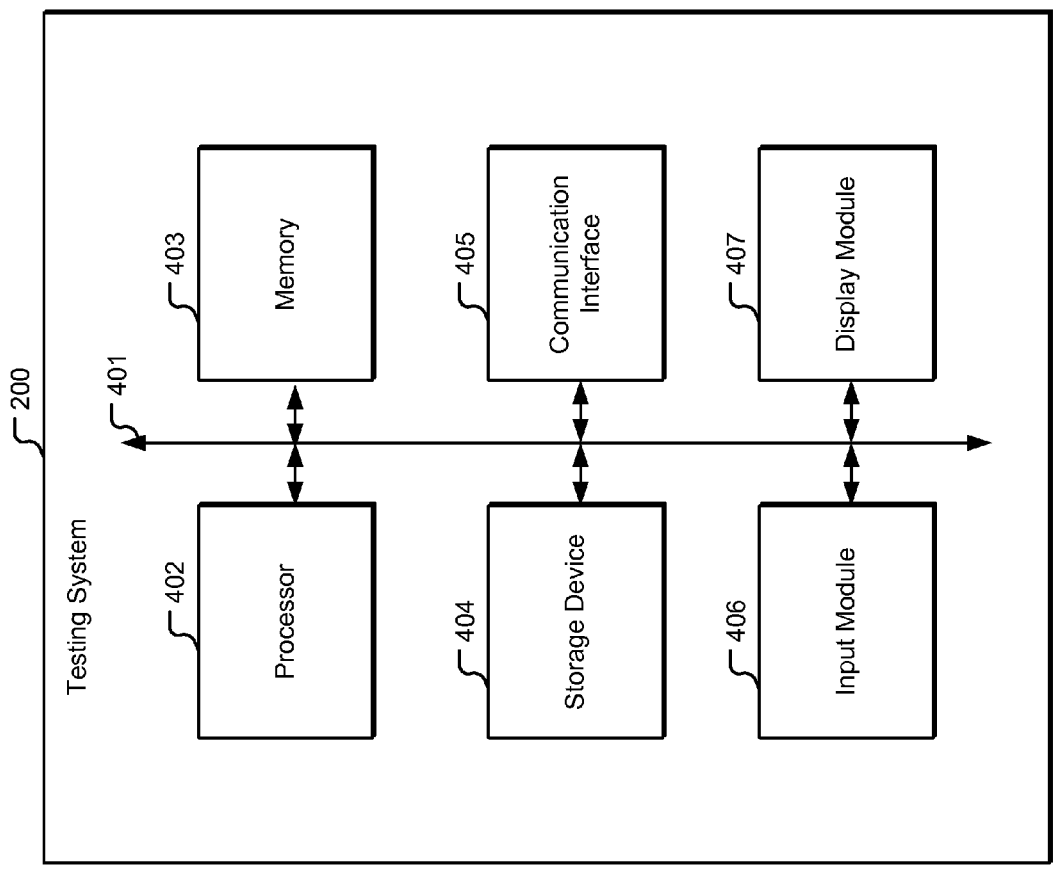

SESSION CLASSES FOR PROCESS AUTOMATION

BACKGROUND OF THE INVENTION

1. Field of the Invention

The present invention relates to process automation and, more specifically, to a method and system for automating actions taken with respect to a man-machine-interface (MMI) between computers or other computerized devices and a user.

2. Description of the Related Art

Most systems, whether they are hardware systems or software systems, have MMIs for interfacing with a user. For example, the MMI is used by the user to generate commands to be run by the hardware or software system and receive and display the responses generated in response to those commands. One simple example of an MMI in a software system may be an Internet web page that requires a user to enter a login ID and a password to log into the web page. When the Internet web page is to be tested, it may be necessary to enter various combinations of login IDs and passwords into the Internet web page to confirm the login feature of the web page. Another example of an MMI for hardware systems may be the command line interface (CLI) of a network switch or a router. A user may issue various commands to such router via its CLI to test various functionalities of the router. Most hardware or software systems require quality assurance (QA) and system verification tests (SVT) before it is released for actual use by the public. It is preferable to automate SVT process, so that the SVT process can be carried out efficiently and accurately.

Software test automation, or process automation in general, typically requires that a testing program operate like a human interacting with a command-line interface (CLI) via protocols such as telnet, SSH (Secure Shell), or via a serial port. FIG. 1 illustrates a conventional SVT system interacting with a system under test (SUT). The SUT 120 may be, for example, a router or network switch to be tested, and the testing system 100 may be a computer used by a user to test the SUT 120. The testing system 100 includes a MMI 180 such as a CLI or a graphical user interface (GUI) such as a web page or a Java application. The testing system 100 (such as a test program) sends requests 140 containing commands to the SUT 120 to perform a configuration step in the test or to extract information from the SUT 120. The user of the testing system 100 uses the MMI 180 to issue such requests 140. In response to the requests 140, the SUT 120 sends responses 160 to testing system 100. The responses 160 may be text, or otherwise formatted in a way intended for human operators or users 191 to digest.

Such testing process may be automated by use of "scripts" 190 that contain a collection of such requests 140 to be issued to the SUT 120. The script 190 describes a procedure to be followed by the testing system 100 to automate a task that would otherwise be performed by a human user 191. This script 190 can be written in a variety of different languages that a computer testing system 100 can interpret to drive the MMI 180 and issue the requests 140 to the SUT 120 and receive responses 160 based on the issued requests 140. The script 190 performs tasks through these MMIs 180 in the same way a human user 191 might do it, for example, by sending commands to a CLI, clicking buttons on a GUI, entering arguments for certain commands, etc.

While using scripts 190 has the advantage of automating the process of running tests on the SUT 120, the creation of these scripts 190 is complex and time-consuming. Conventional techniques for generating scripts for test automation or other process automation include a capture-generate method and a keyword-driven method.

In the capture-generate method, the testing system computer 100 monitors and captures all the requests (actions) 140 made as the human user 191 performs the task once and uses this information to generate a script that will perform the same actions 140 in the same sequence based on the captured requests. The capture-generate method is very fast, simple, and easy to use, but has many shortcomings. Most notable among these shortcomings is that the script generated by the capture-generate method tends to be verbose and difficult to maintain, because it will consist of a long sequence of low-level actions corresponding to all the recorded low-level actions 140 taken by the user. For example, when working with a GUI 180, the human user 191 may fill in a form on a screen displayed on the MMI 180 of the testing system computer 100, which may be captured as a long sequence of mouse clicks, keyboard actions, or perhaps, at best, control-specific actions. The capture-generate technique fails to capture the overall structure of the recorded test procedure and therefore produces scripts that are not modular or reusable.

On the other hand, the keyword-driven method uses a higher-level computer language where a list of "keywords" are assembled by the human user 191 to describe the overall flow of the test/process, where each keyword corresponds to a script or script fragment that will perform the actual actions (requests) 140 to accomplish the sub-tasks. The keyword-driven approach simplifies the task of automation, especially for human users that are not computer programming experts. If a full set of keywords can be implemented, then it can be useful in automating the test or other process automation. However, the keyword-driven method is less intuitive for users compared with the capture-generate method and is not as fast for most situations. Also, the keyword-driven method requires that a comprehensive set of keywords be implemented a priori, in advance of any actual test run on the SUT 120.

SUMMARY

According to various embodiments, a script including a plurality of actions to process in a session associated with a system is generated via a user interface, where the script includes both actions and metaactions. The actions correspond to commands associated with the session to be executed on the system, and the metaactions correspond to a selected plurality of such commands. The script is generated by receiving the actions and the metaactions to process on the system via the user interface associated with the session for interfacing with the system, capturing the actions and the metaactions, and saving the captured actions and metaactions to generate the script.

In one embodiment, session class calls are selected via the user interface, where each session class call is configured to invoke one of the metaactions. Each of the metaactions is defined in session classes stored in the computer system. At least one of the metaactions is configured to initialize the session.

In one embodiment, the generated script can be executed on the system to re-run the previously captured process. The metaactions in the script are converted to actions using definitions of the metaactions in the session classes for execution on the system.

The present invention has the advantage that scripts captured by the sessions classes based approach according to embodiments of the present invention have the advantages of editing simplicity, modularity, reusability, and readability, etc. At the same time, the session class based method of generating a script still provides capabilities for intuitive and speedy capture of command level actions to the system under test.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 3I illustrates an example screenshot of a test report generated as a result of executing a test script, according to one embodiment.

FIG. 4A illustrates the hardware architecture of a SVT system, according to one embodiment.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

In general, the present invention provides software for providing session classes to generate test script in an efficient and automated manner. A script including a plurality of actions to process in a session associated with a system is generated via a user interface, where the script includes both actions and metaactions. The actions correspond to commands associated with the session to be executed on the system, and the metaactions correspond to a selected plurality of such commands. The script is generated by receiving the actions and the metaactions to process on the system via the user interface associated with the session for interfacing with the system, capturing the actions and the metaactions, and saving the captured actions and metaactions to generate the script. The term "session classes" herein is used to refer to a collection of metaactions where each metaaction includes a plurality of command level actions.

Figure 1:
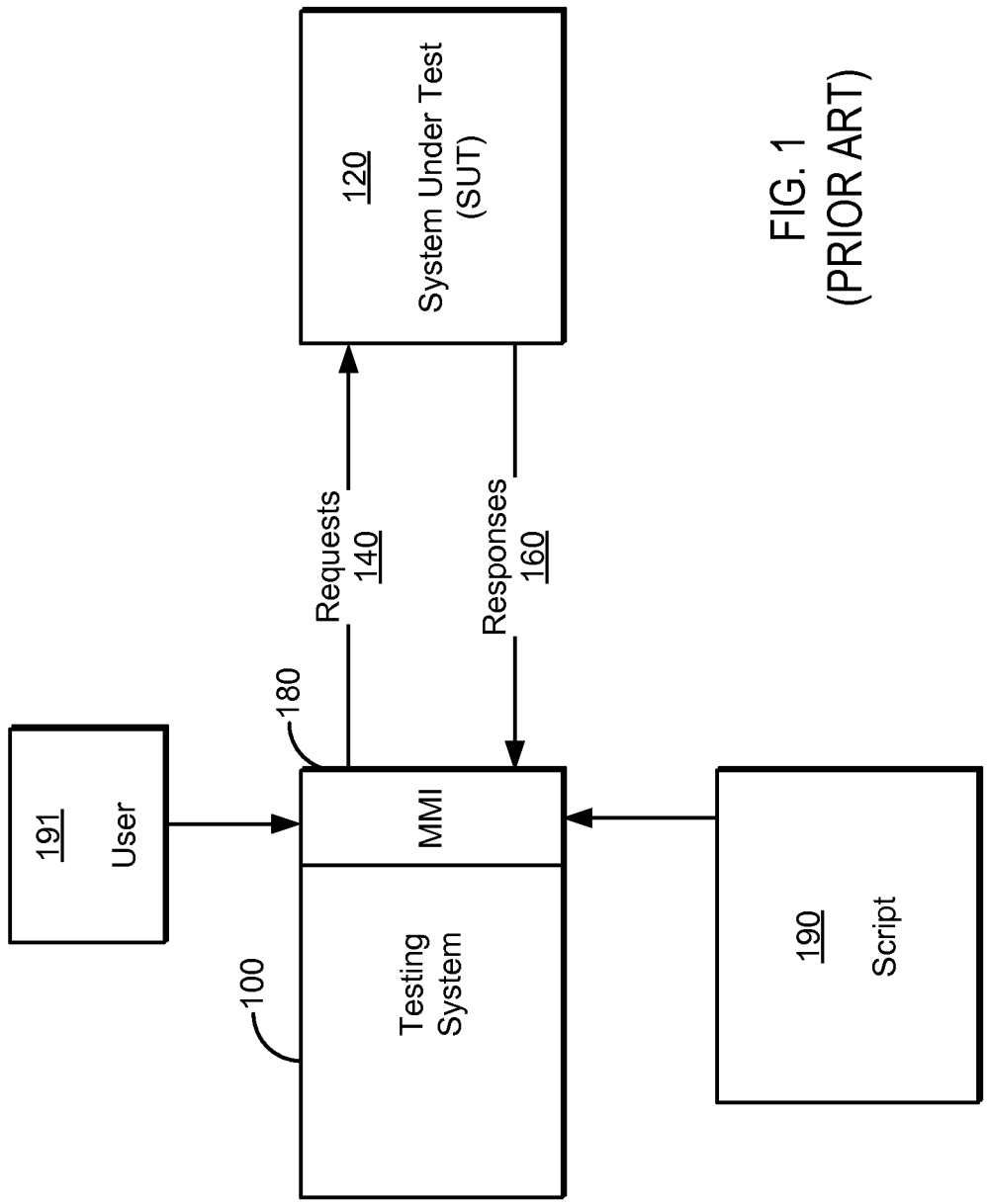
FIG. 1 illustrates a conventional System Verification Test (SVT) system interacting with the System Under Test (SUT).
Figure 2A:
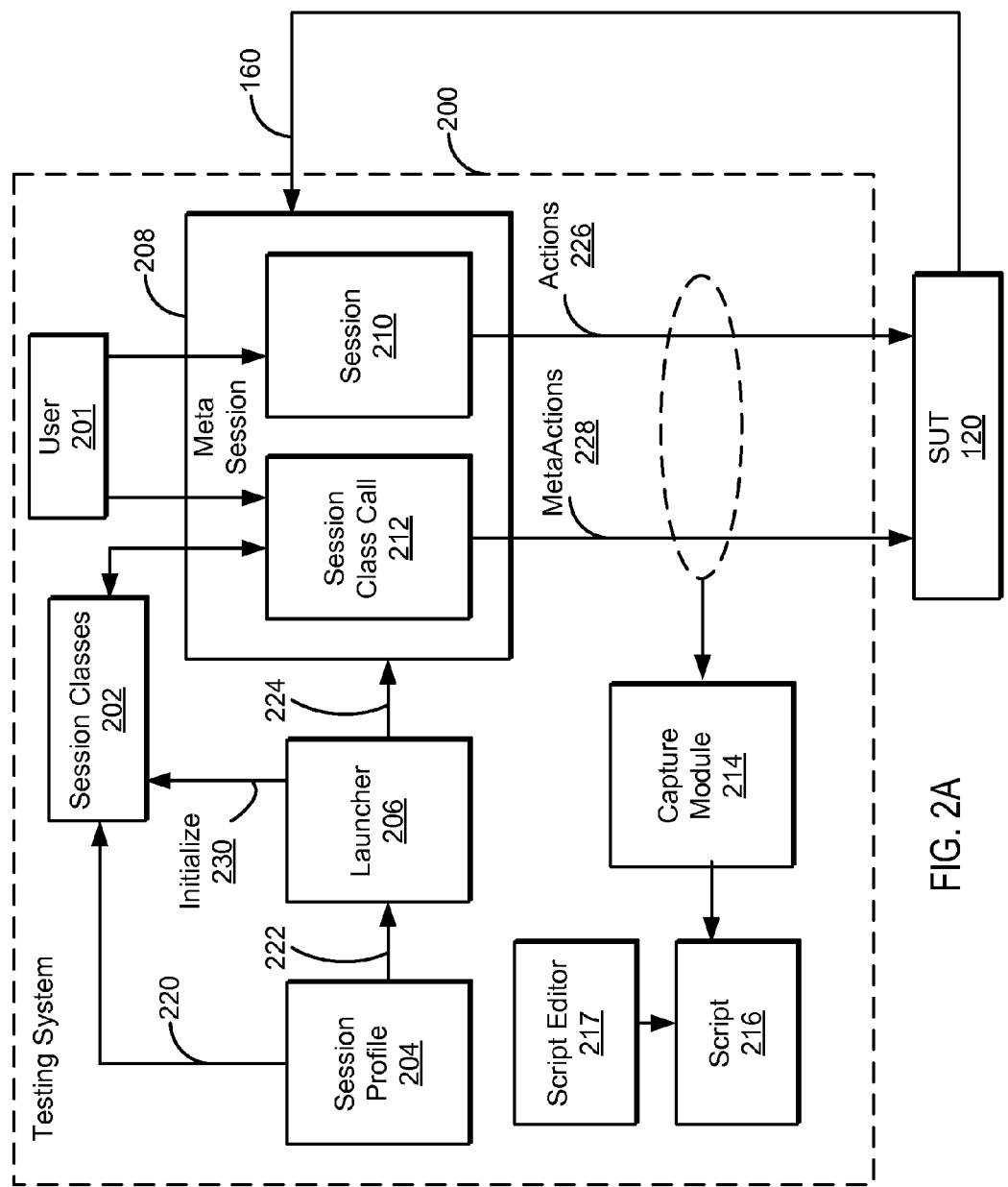
FIG. 2A illustrates the architecture of a SVT system for generating a test script for SVT using session classes, according to one embodiment.

Turning to the figures, FIG. 2A illustrates the architecture of a SVT system for generating a test script for SVT using session classes, according to one embodiment. The SVT system includes a testing system 200. Testing system 200 verifies the functionalities of, and assures the quality of, the SUT 120. The SUT 120 may be any type of hardware device, such as a computer, a networking device, a router, etc., or can also be computer software running on a computer or an Internet web page, and may also include a plurality of such hardware or software devices. Testing system 200 sends various requests including actions 226 and metaactions 228 to the SUT 120 to test the functionalities of SUT 120. Herein, actions 226 are commands designed to test the functionalities of interest of SUT 120, and the metaactions 228 are one or more sets of a plurality of command level actions designed to test the functionalities of interest of SUT 120. In response, SUT 120 sends responses 160 corresponding to the commands of the actions 226 and metaactions 228 back to the testing system 200. In one embodiment, the responses 160 are in textual format so that a human operator user 201 of testing system 200 may understand conveniently.

Testing system 200 includes a variety of software modules such as session classes 202, session profile 204, launcher 206, capture module 214, test scripts 216, and script editor 217. When a user 201 wants to use a MMI as part of a capture sequence in running tests against the SUT 120, the user 201 "starts the MMI" by using the session profile 204. Session profile 204 stores a variety of information describing the type of MMI and other information about how the MMI should be initialized. User 201 calls launcher 206, which in turn reads 222 the session profile 204 to launch the MMI which is referred to herein as "Meta Session" 208. Meta Session 208 includes the actual session 210 such as a CLI or a GUI for use in issuing actions for testing the SUT 120 and a set of "Session Class Calls" 212 that is used to call the session classes 202 for use in issuing the metaactions 228 for testing the SUT 120.

Session profile 204 has associated "session classes" 202. The session classes 202 provide additional information about the MMI metasession 208. Session classes 202 include a set of named automated subtasks or "procedures" that are relevant to that particular type of MMI session 210. In other words, session classes 202 include a set of a metaactions 228, where each metaaction is a procedure for running plurality of command level actions 226. In addition, the session classes 202 include one particular procedure (e.g., "login") that is specifically designed for initializing the session 210 immediately after the user starts the session 210.

When a session 210 has associated session classes 202, the normal MMI (terminal or CLI, browser for GUI, etc.) of the session 210 is supplemented with additional UI controls for calling the metaactions 228 in the associated session classes 202. The primary UI control in the MMI allows a user to see a list of available automated procedures (or metaactions 228) relevant to the session 210 used by the user 201 interactively for testing of the SUT 120. The metaactions 228 may be run on SUT 120 at the will of user 201 or not run at all. At any point during the testing on SUT 120, the user 201 can choose one of the items (i.e., metaactions 228) from the procedure list (i.e., session class call 212), which invokes the metaactions 228 referenced in the session class calls 212. A "metaaction" 228 is a reference to call one of the session classes 202. As a result, a sequence of automated actions corresponding to the invoked metaaction 228 is run on that session 210, pursuant to the predefined metaactions stored in the session classes 202, and then the session 210 is returned back to normal interactive mode when the called procedure (i.e., metaaction 228) has finished executing. Some metaactions 228 may use arguments that allow the user 201 to fine-tune the behavior of the metaaction 228, in which case the user 201 is prompted to provide the argument values after selecting the metaaction 228 and before it executes.

As explained above, the initialization procedure (e.g., login) in the session classes 202 is run as soon as the user 201 starts the session 210, before the user 201 has control over the MMI of the session 210. As a result of the initialization procedure, testing system 200 becomes aware that the user 201 is running a test on SUT 120 which should be captured. In addition, testing system 200 also becomes aware of any session classes 202 that are invoked by user 201 via the session class calls 212 in metasession 208. Capture module 214 thus captures the command level actions 226 issued by the MMI session 210 and the metaactions 228 issued by invoking the session class calls 212, and such test steps including the actions 226 and metaactions 228 are stored by capture module 214 as test scripts 216. As a result, the test steps that are captured and stored as test scripts 216 reflect a combination of actions 226 that are low-level or command level activity performed by the user 201 directly in the MMI session 210 and the metaactions that are invocations of the high-level session class procedures 202, with the corresponding argument values, if any. In this manner, the script 216 generated from this metasession 208 (or from multiple captured sessions) will include both low-level actions 226 and high-level metaactions 228 interleaved appropriately. For example, the scripts 216 may be created with XML (eXtensible Markup Language) that describes each of the steps in a test program. A step typically forms part of a session 210, which describes the protocol to use for communication with the SUT 120 and other connection characteristics that may be required. Each step describes the actions 226 to take or session classes 202 to call via metaactions 228 during such session 210 and other information appropriate for those actions 226 and metaactions 228. For example, if the SUT 120 is controlled through a command-line interface via telnet, then the action may be to "send a command" and additional properties to describe what command to send and how to determine when the response is complete.

Script editor 217 is a script editing tool that allows user 201 to create and/or edit scripts 216 that are comprised of the "steps" that operate on specified sessions 210, where these steps may be a combination of lower level (command level) actions 226 and high level metaactions 228. This results in highly readable and maintainable scripts. Also, because the MMI meta session 208 is started via the session profile 204, testing system 200 can recognize that subsequent user actions in that MMI session 208 are part of the test activity to be captured, which allows for many concurrent MMIs to be used as part of the same test/process to be automated.

Figure 2B:
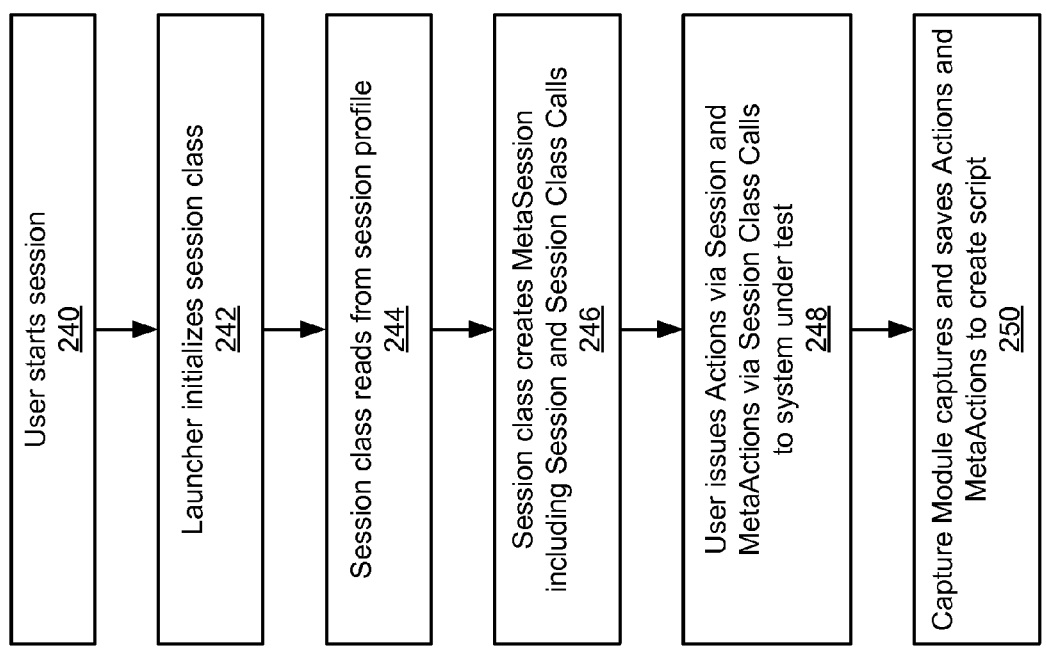
FIG. 2B illustrates a method of generating a test script for SVT using the session classes, according to one embodiment.

FIG. 2B illustrates a method of generating a test script for SVT using the session classes, according to one embodiment. The process in FIG. 2B is carried out when the user of the testing system 200 uses the metasession 208 and session classes 202 to run tests on the SUT 120. Such test procedures are captured to generate a test script, which can then be re-run on the SUT 120 or even edited for modification. As the user 201 starts 240 the session by invoking the launcher 206, launcher 206 initializes the session classes 202 in step 242. As explained above, the user can start initialization of the session classes 202 by running a command such as "login" which will automatically cause the launcher 206 to initialize the session classes 202.

The session classes 202 reads 244 from its associated session profile 204 a variety of information regarding the MMI metasession 208, and creates 246 the MMI metasession 208 including the session 210 and session class calls 212. As a result, the user 201 in step 248 can issue actions 226 via session 210 and also issue metaactions 228 from the session classes 202 via session class calls 212 to the system under test. Capture module 214 captures and saves 250 the actions 226 and metaactions 228 to generate a script 216 that can re-run on the SUT 120.

Figure 2C:
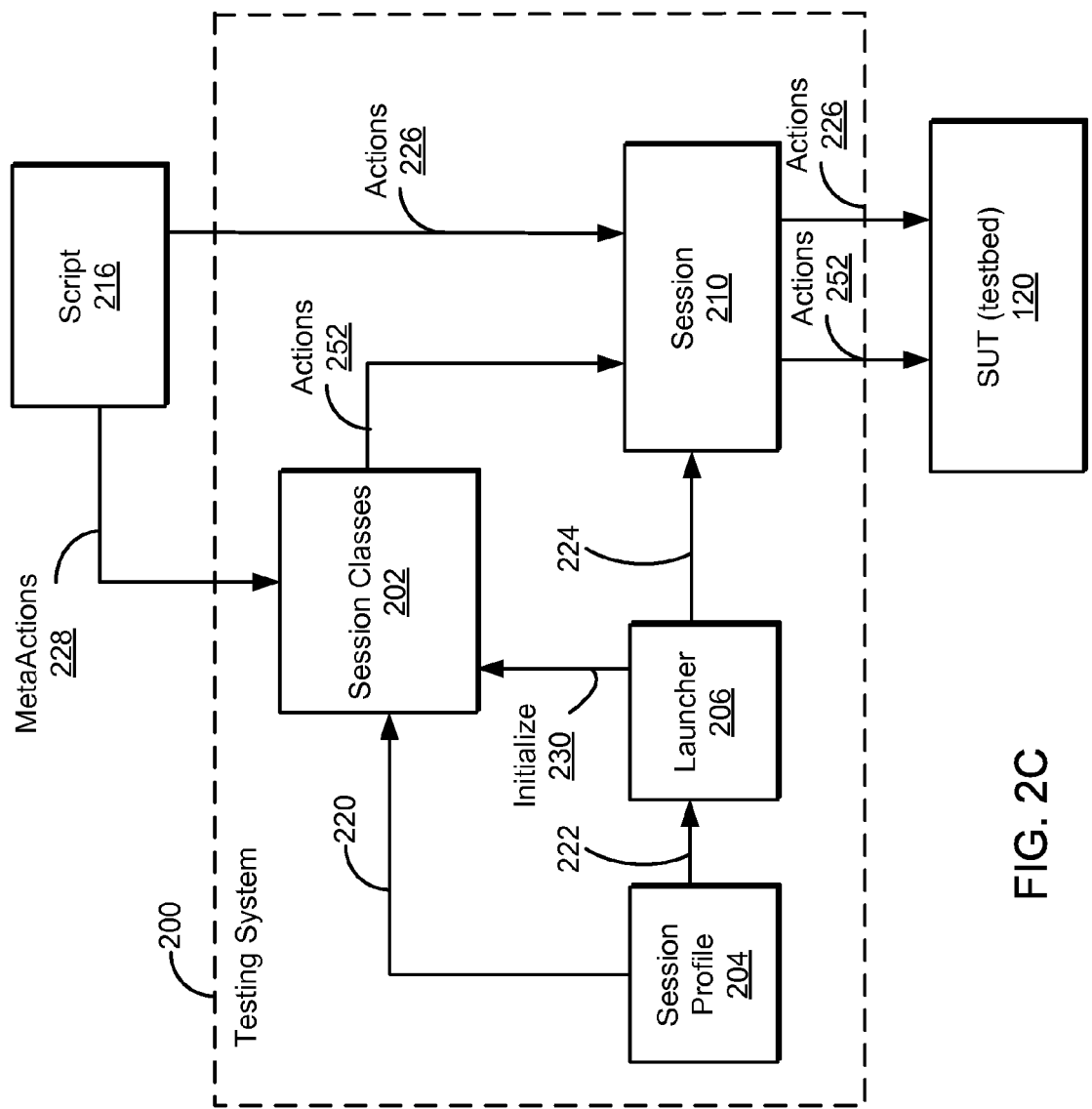
FIG. 2C illustrates the architecture of a SVT system for running a test script for SVT using session classes, according to one embodiment.

FIG. 2C illustrates the architecture of a SVT system for running a test script for SVT using session classes, according to one embodiment. The SVT system shown in FIG. 2C is similar to that shown in FIG. 2A, but it should be noted that the testing system 200 no longer has a meta session 208 with session class calls 212. This is because the embodiment shown in FIG. 2C is for the re-run phase of the test script and thus does not require the session class calls 212 for the user 201 to invoke the session classes 202 to issue the metaactions 228.

As before, launcher 206 launches the session 210 and the session classes 202, and session classes 202 reads from session profile 204 to obtain information regarding the session 210. The user 201 can use the captured (and possibly edited) script 216 to re-test the SUT 120 again based on the captured test steps. In this regard, the script 216 would contain command level actions 226 and also higher-level metaactions 228 previously captured during the capture phase of SVT. The command-level actions 226 are issued to the SUT 120 via the session 210 (e.g., CLI, GUI, etc.). On the other hand, the higher-level metaactions 228 are converted into command level actions 252 by the session classes 202, which are then issued to SUT 120 via the session 210. Thus, testing system 200 can reproduce the test procedures carried out by the user's previous test on the SUT 120 by running the captured script 216.

Figure 2D:
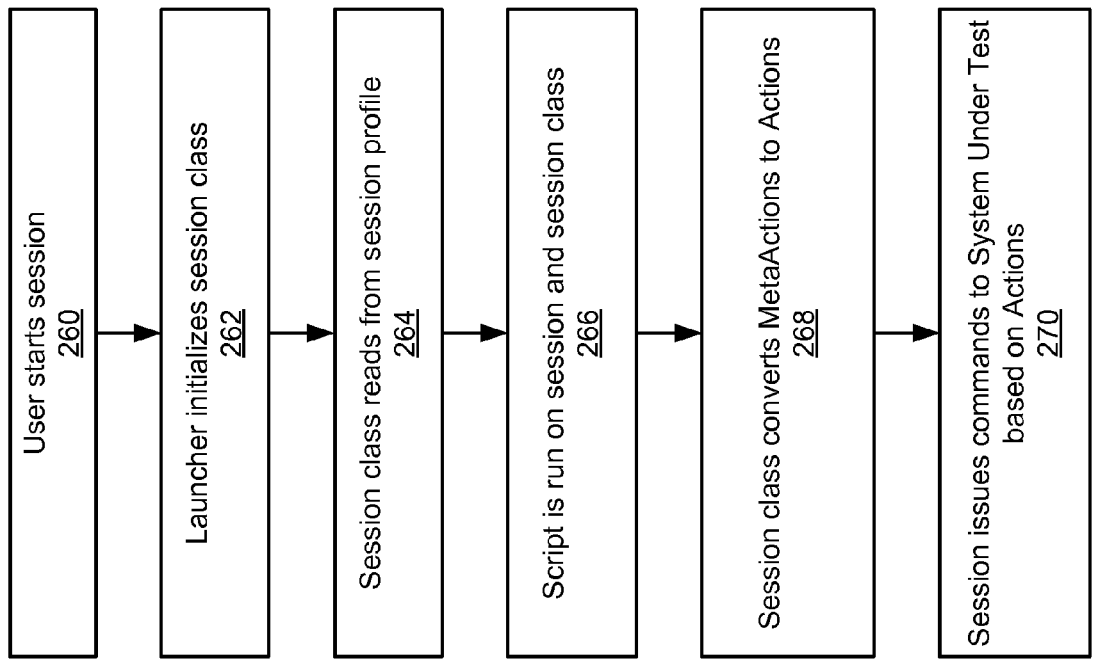
FIG. 2D illustrates a method of running a test script for SVT using the session classes, according to one embodiment.

FIG. 2D illustrates a method of running a test script for SVT using the session classes, according to one embodiment. The process in FIG. 2D is carried out when the user of the testing system 200 uses captured (and possibly edited) script 216 to run tests on the SUT 120. As the user 201 starts 260 the session by invoking the launcher 206, launcher 206 initializes the session classes 202 in step 262. As explained above, the user 201 can start initialization of the session classes 202 by running a command such as "login" which will automatically cause the launcher 206 to initialize the session classes 202.

The session classes 202 read 264 from its associated session profile 204 a variety of information regarding the MMI session 210. In step 266, the script 216 is run on the session 210 and the session classes 202, and the session classes 202 convert 268 the high level metaactions 228 to command level actions 252 so that they can be run on the session 210 as well. Thus, the session 210 issues commands to the SUT 120 based on the actions 252, 226.

The present invention has a variety of benefits. First, users can run tests on the SUT more efficiently and capture the process steps they used to run the tests in a very efficient manner, rather than having to write scripts by hand. In doing so, users can create scripts very fast and efficiently, because the session classes can perform certain sequences of actions quickly and thus there would be no need to perform individual command level actions in the test to the extent a session class for such sequence of actions is available. For example, one can consider the situation in which a hundred VLANs on a router SUT may have to be configured. It would take hours to perform such task by issuing command level actions to the router SUT for all one hundred VLANs. But if there is a session class procedure that corresponds to configuring VLANs in a session interacting with a router SUT, then that can be done in a much shorter amount of time, for example, in a minute.

Second, scripts captured according to the session classed based approach herein are more modular and reusable. Because the generated script contains high-level calls to a common set of session class procedures, these scripts become more readable and therefore easier for users to understand and edit. Furthermore, enhancements or modifications to existing session class procedures would take effect on all scripts that invoke those session class procedures, making modification to the test script very efficient and convenient.

Third, the captured script is highly modular. The natural tendency for a user during testing and capture will be to use session class procedures whenever they are available to save time. Each session class or a group of session classes may form a modular piece of the entire test process, making it easy for the user to use such modular piece of the test process in creating or editing other test procedures. Also, the initialization procedure (e.g., "login"), in particular, will enable the session to start at a clean initialized state before capturing the test process in such highly modular manner.

One will also notice that, unlike the conventional keyword-driven approach, there is no need for session class procedures to be comprehensive or complete. Users can take advantage of the session class procedures that exist, but can also issue command level actions to the SUT when an appropriate session class procedure does not exist, thereby mixing and matching higher level session class procedures with command level actions to the SUT that have direct interactivity with the MMI session itself. Compared with scripts generated in conventional programming languages, a step-oriented script editing experience with session class awareness makes it easy and fast for users who are not necessarily programming experts to take advantage of the script's modularity without necessarily having to fully understand the implications.

In summary, the scripts captured by the sessions classes based approach according to embodiments of the present invention have the advantages of editing simplicity, modularity, reusability, and readability, etc. while at the same time still providing capabilities for intuitive and speedy capture of command level actions to the SUT.

Figure 3A:
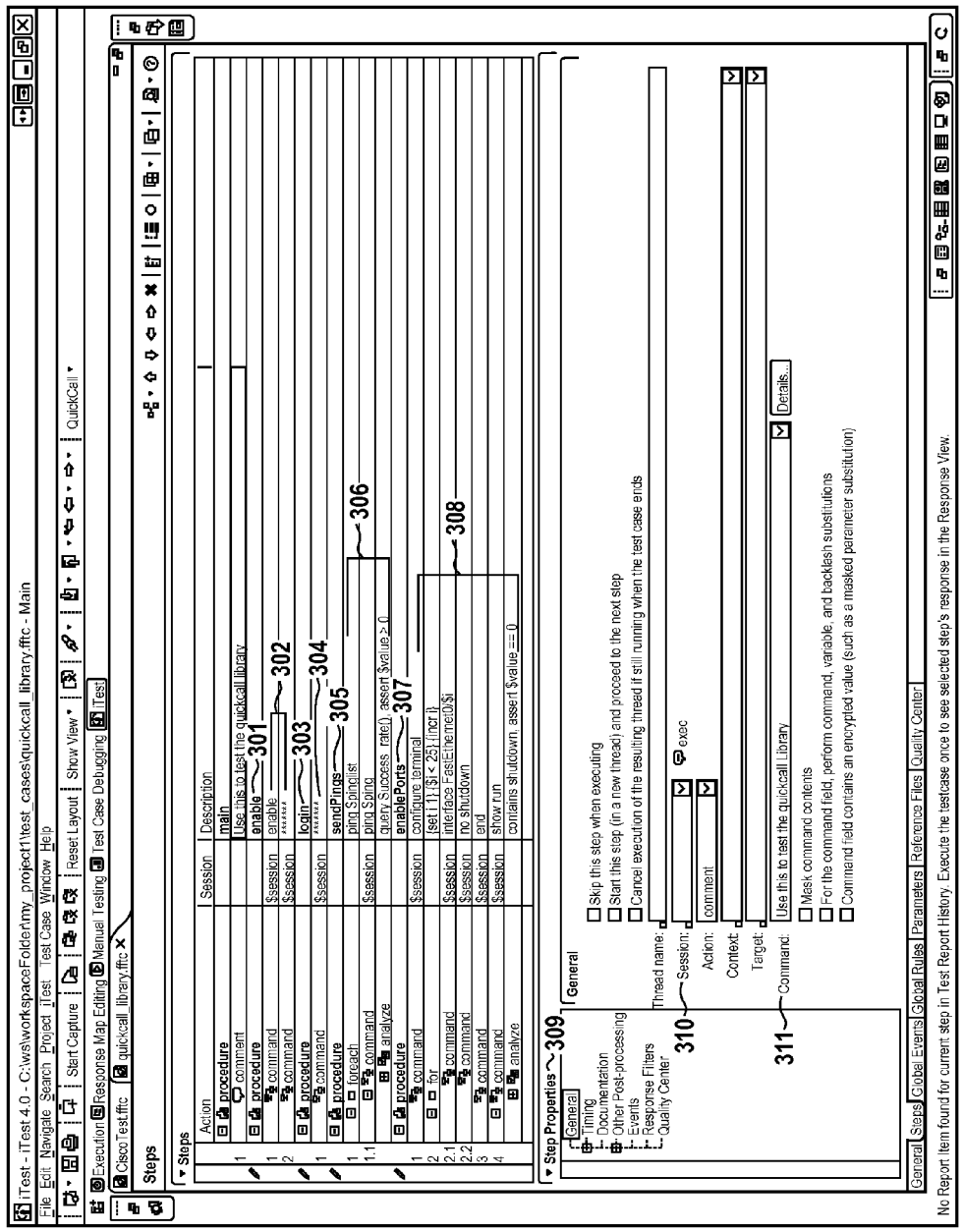
FIG. 3A illustrates an example screenshot of a session classes file, according to one embodiment.

FIG. 3A illustrates an example screenshot of a session classes file, according to one embodiment. The session class file is also referred to in this example as "QuickCallLibary" and corresponds to the session classes 202. The session classes file is a file describing a set of procedures that are intended to become methods attached to a certain session profile 204. The session profile document 204 would have a link to this session class file indicating that the session class file is where the testing system would find the session class procedures for that session.

As explained above, the session classes file defines a set of procedures that make up the session classes 202. In the example of FIG. 3A, four session class procedures are shown, including the "enable" procedure 301, the "login" procedure 303, the "sendPings" procedure 305, and the "enablePorts" procedure 307. The "enable" procedure 301 is a metaaction 228 that includes two command level actions 302, the "login" procedure 303 is a metaaction 228 that includes one command level action 304 that is repeated, the "sendPings" procedure 305 is a metaaction 228 that includes two command level actions 306, and the "enablePorts" procedure 307 is a metaaction that includes a number of command level actions 308.

The "enablePorts" procedure 307 is an example showing that procedural logic may also appear in the session class procedures (metaactions), rather than just a "macro" or "collection" of simple commands level actions. In this case, the "enablePorts" procedure is iterated over all ports of the SUT. As explained above, the "login" procedure 303 is an initialization procedure that is automatically called when starting an interactive session. The "Step Properties" window 309 also shows that the user can edit the session classes file by editing or adding session classes procedures, by entering the session class name 310 and associating the session class with commands 311.

Figure 3B:
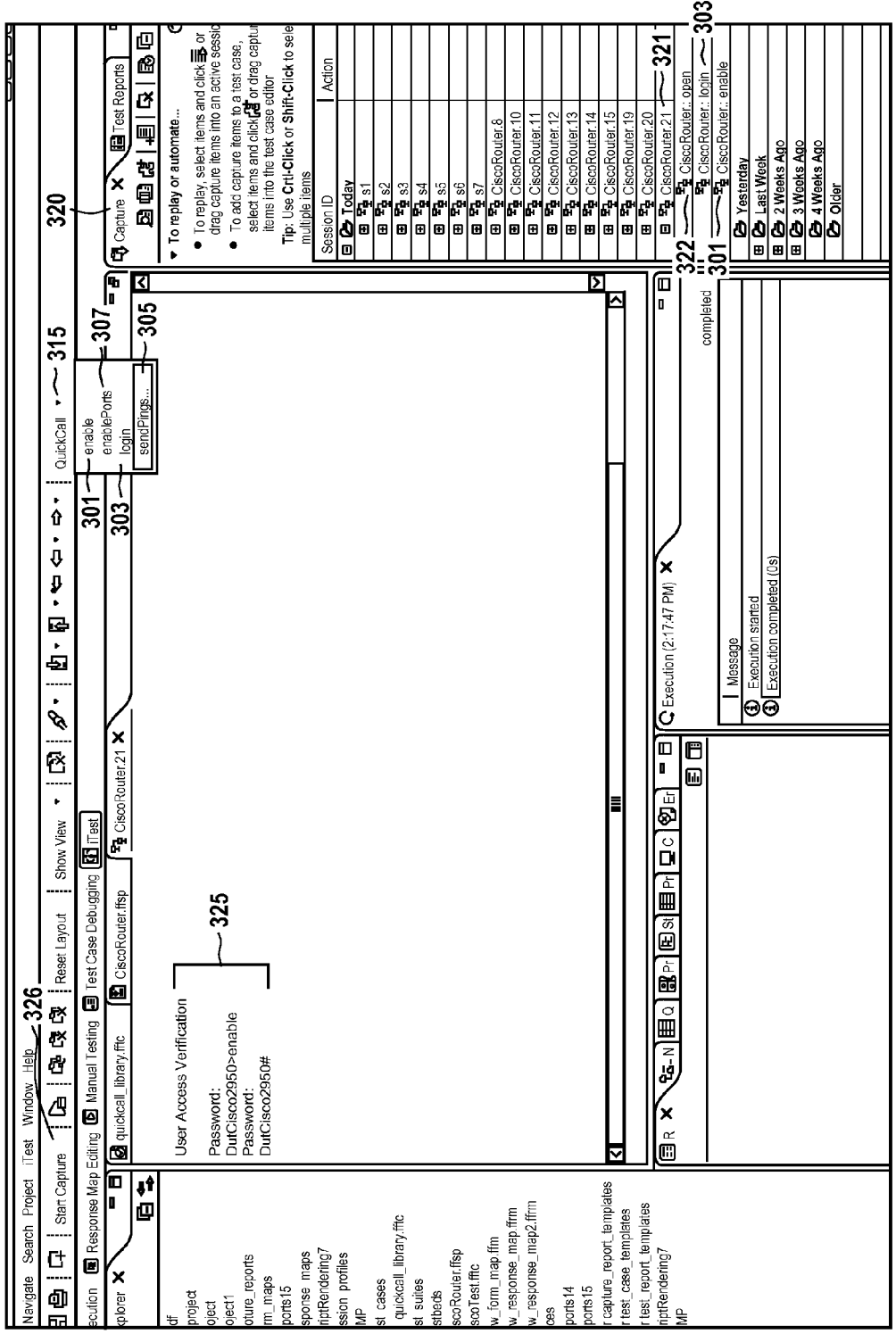
FIG. 3B illustrates an example screenshot showing an interactive session started using a session profile with the session classes, according to one embodiment.

FIG. 3B illustrates an example screenshot showing an interactive session started using a session profile with the session classes, according to one embodiment. The example of FIG. 3B shows that the "login" initialization procedure 303 has been automatically called when starting an interactive session 321 called CiscoRouter.21, which is the SUT in this example. In the capture screen 320 called as a result of selecting the "start capture" tab 326, the CiscoRouter.21 session shows three steps: open 322 (which corresponds to the user starting the session), login 303 (which was run automatically to initialize the session), and then "enable" 301 which the user chose to invoke via the QuickCalls menu 315. The QuickCall dropdown menu 315 corresponds to the session class calls 212 in the embodiment shown in FIG. 2A, and contains the list of procedures in the session classes 202. In the example of FIG. 3B, the user has just selected the "enable" procedure 301, which was carried out after the login procedure 303 in order to enter the "enable" command and to fill in the password thereafter as shown in the interactive screen text 325. In the same screenshot, the user is about to choose the "sendPings" procedure 305 from the QuickCall dropdown list 315. Because the "sendPings" procedure 305 requires arguments, a dialog for the user to enter the arguments is needed for the "sendPings" procedure 305 to run.

Figure 3C:
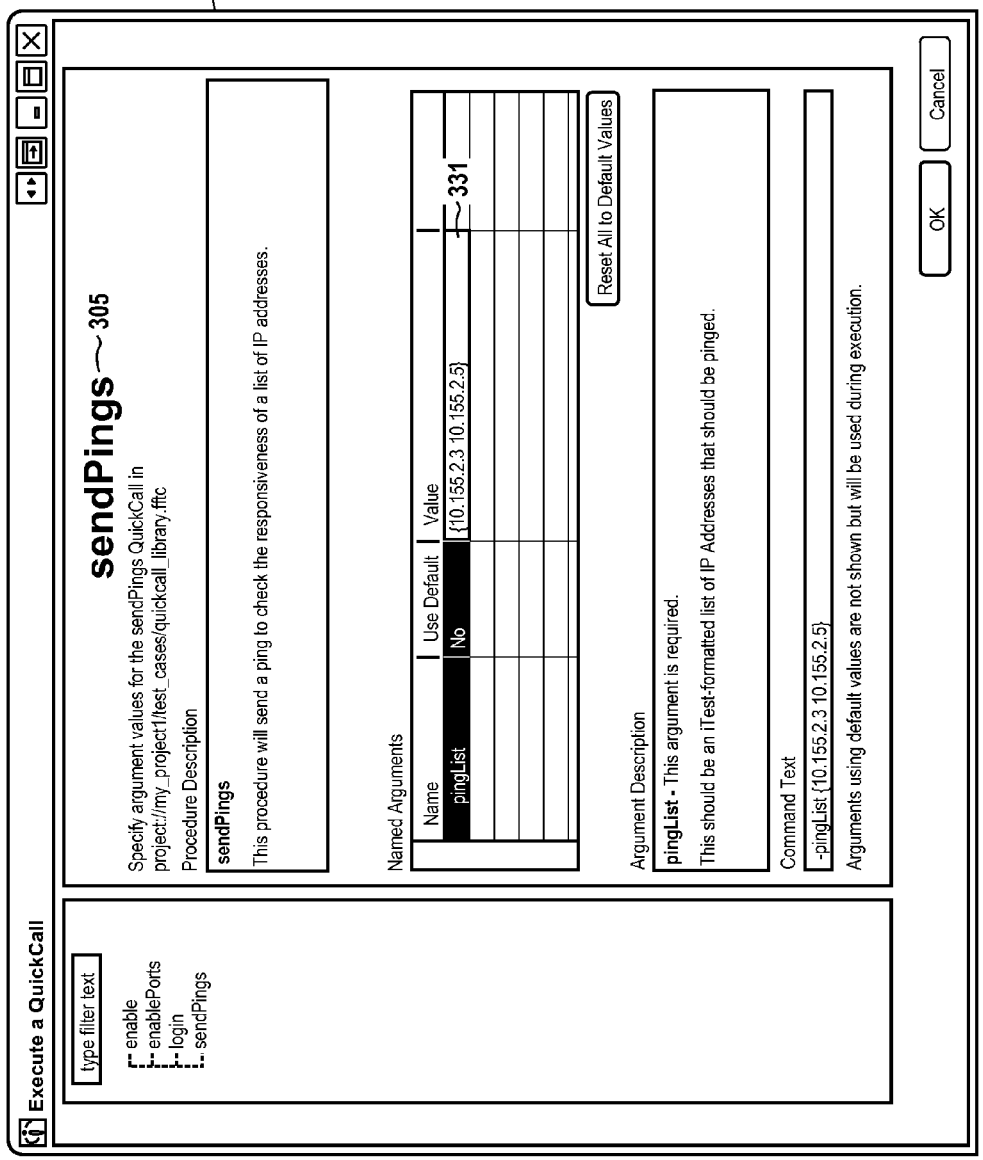
FIG. 3C illustrates an example screenshot of a user interface for entering arguments needed for metaactions of the session classes, according to one embodiment.

FIG. 3C illustrates an example screenshot of a user interface for entering arguments needed for metaactions of the session classes, according to one embodiment. The screenshot of FIG. 3C shows the dialog 330 that would appear when the "sendPings" procedure 305 is selected, so that the user can enter the arguments 331 for the "sendPings" procedure 305.

Figure 3D:
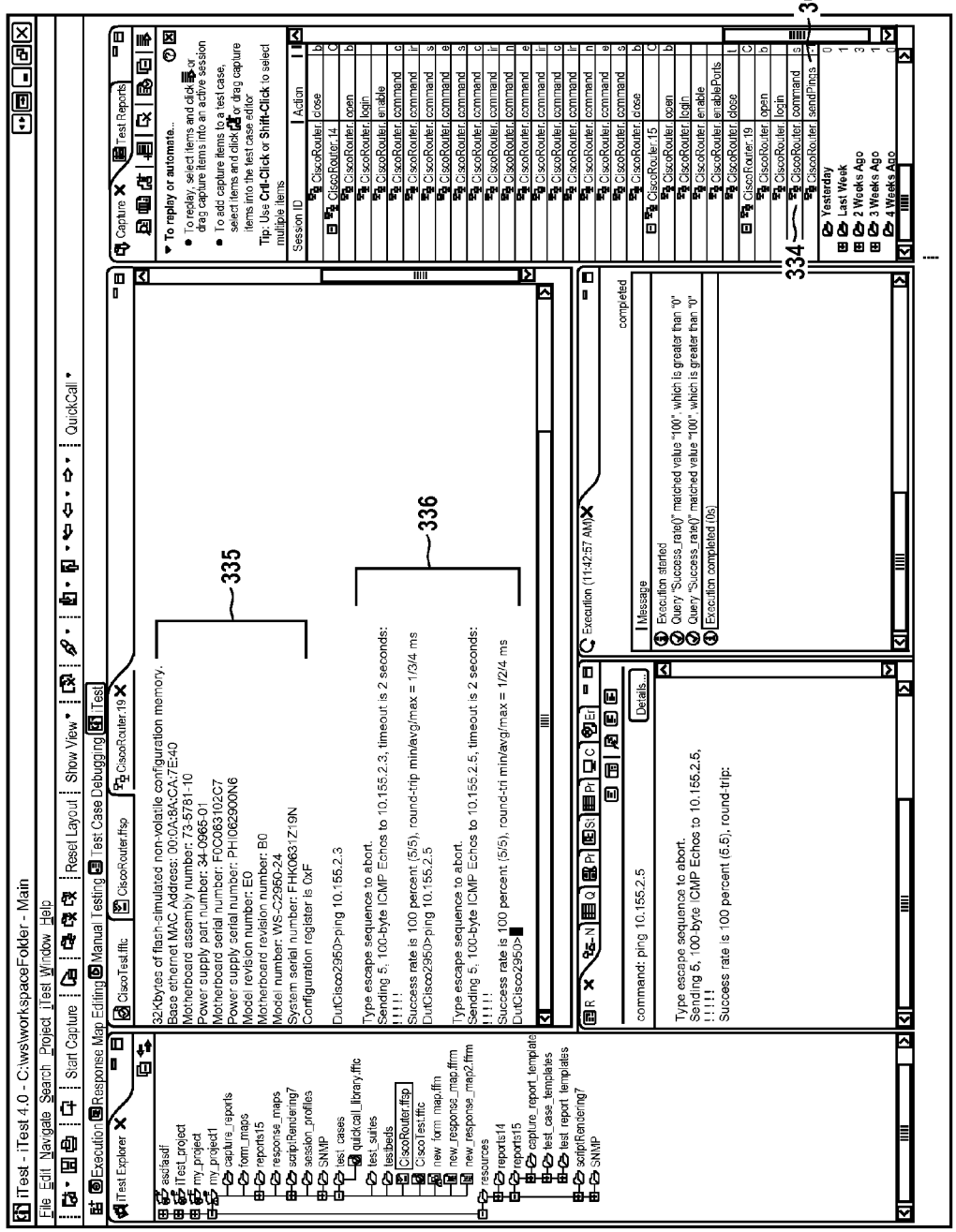
FIG. 3D illustrates an example screenshot of the results displayed as a result of executing metaactions of the session classes, according to one embodiment.

FIG. 3D illustrates an example screenshot of the results displayed as a result of executing metaactions of the session classes, according to one embodiment. The example screenshot of FIG. 3D shows the results of having executed the "sendPings" procedure 305 in the interactive session. In the example of FIG. 3D, a "show version" command level action 334 has been executed prior to "sendPings" metaaction 305. The responses 335 resulted from executing the "show version" command 334, and the responses 336 resulted from executing the "sendPings" procedure 305.

Figure 3E:
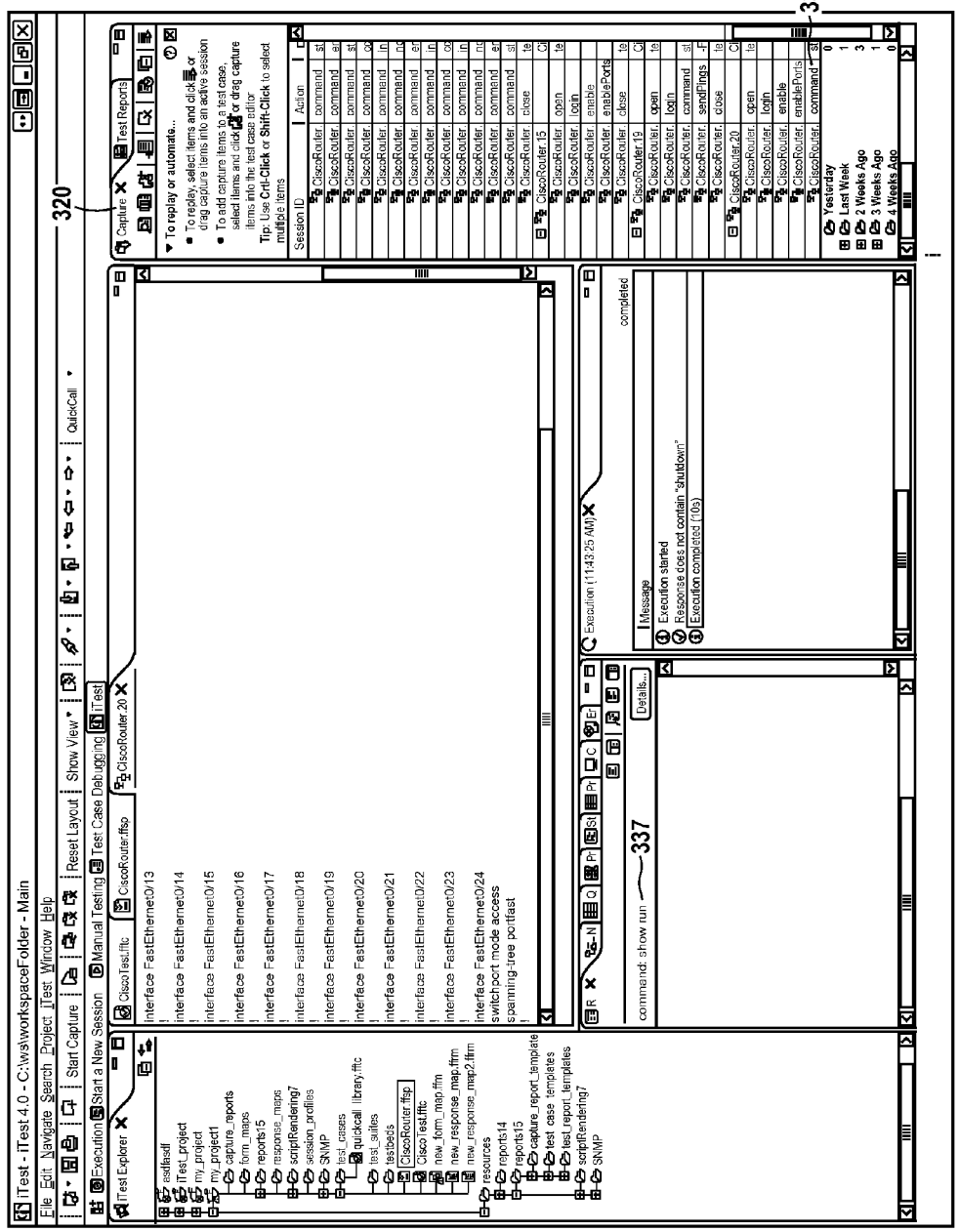
FIG. 3E illustrates an example screenshot of a user interface for entering and executing command level actions, according to one embodiment.

FIG. 3E illustrates an example screenshot of a user interface for entering and executing command level actions, according to one embodiment. In the example of FIG. 3E, users can issue individual command level actions 226 such as the command "ShowRun" 337 without getting any session class involved. Such command level actions 226 are also captured in the capture window 320 as shown in the captured "command" 338. Thus, present invention enables the user to issue both command level actions and session classes via a consolidated user interface, both of which are captured to generate a captured script.

Figure 3F:
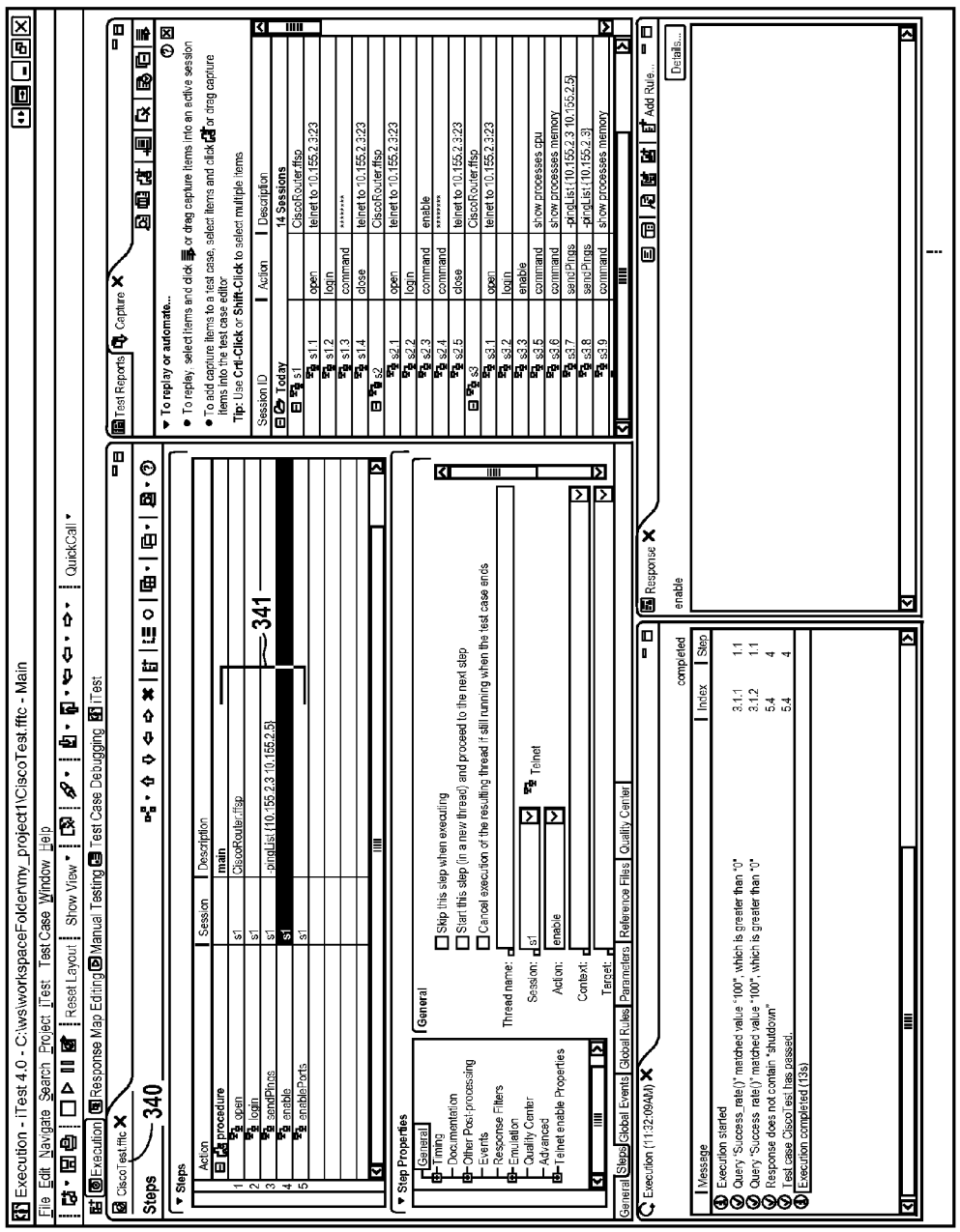
FIG. 3F illustrates an example screenshot of a test script generated as a result of the capture process of the SVT, according to one embodiment.

FIG. 3F illustrates an example screenshot of a test script generated as a result of the capture process of the SVT, according to one embodiment. In the example of FIG. 3F, a test script called "CiscoTest.fftc" 340 is generated as a result of capturing the user's command level actions 226 and metaactions 228. In the example of FIG. 3F, all of the captured steps 341 in the test script 340 happen to be session class procedures, although it would be more common for test cases to include session class procedures interleaved with "command" level actions.

Figure 3G:
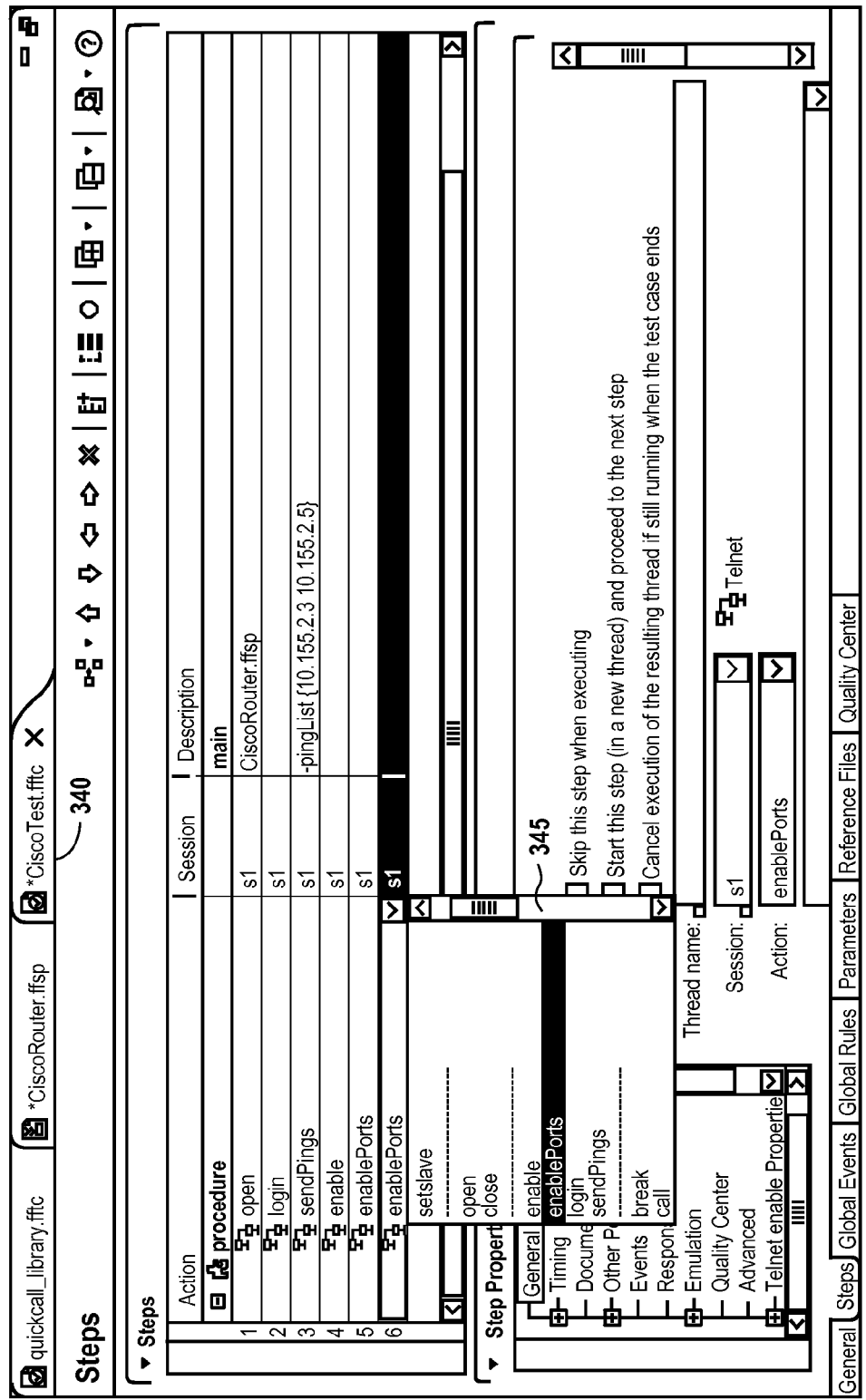
FIG. 3G illustrates an example screenshot of a user interface for manual editing of the test script, according to one embodiment.

FIG. 3G illustrates an example screenshot of a user interface for manual editing of the test script, according to one embodiment. Once the test script 340 is captured, the user can edit the captured test script using the script editor tool 217 (see FIG. 2A), which corresponds to the example shown in FIG. 3G. For example, a drop down list 345 can be used to edit the test script and insert a step. In the drop down list 345, both session class procedures and command level actions are available for adding to the test script 340.

Figure 3H:
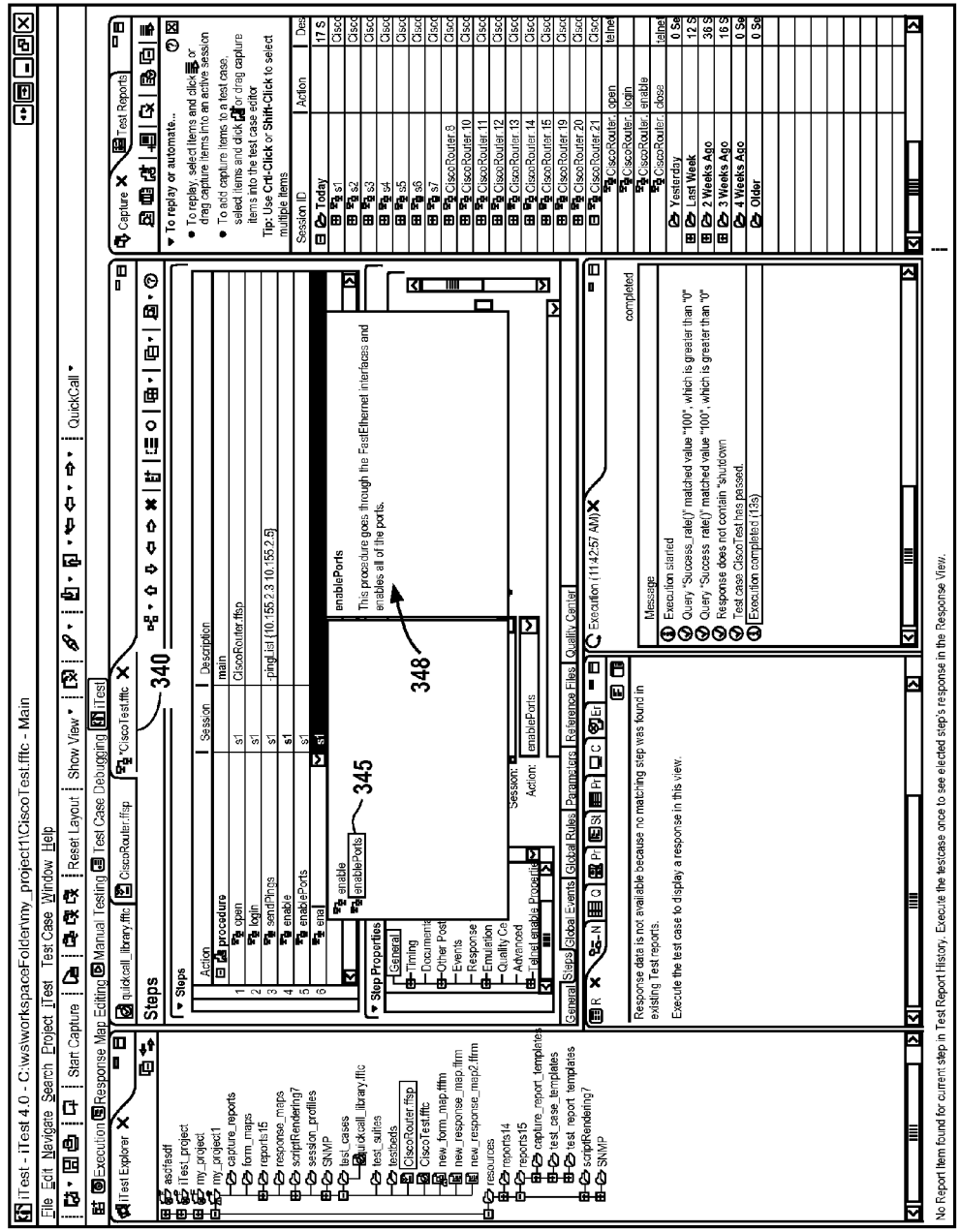
FIG. 3H illustrates an example screenshot of a user interface for manual editing of the test script with a help screen explaining the functions of each metaaction, according to one embodiment.

FIG. 3H illustrates an example screenshot of a user interface for manual editing of the test script with a help screen explaining the functions of each metaaction, according to one embodiment. If the user enters a session class procedure directly into the captured test script 340, the test system can provide explanations 348 on the functions of such session class procedures to guide the user in editing the test script 340. Such help functionality can also be provided by script editor 217 (see FIG. 2A).

FIG. 3I illustrates an example screenshot of a test report generated as a result of executing a test script, according to one embodiment. When a test script 340 involving session classes are executed on the SUT, the test report 345 shows the specific command level actions and session class procedures (metaactions) executed as the executed steps 350. The session class procedures are indicated in the test report 345 like any other step in the test script, and thus the test report becomes much more readable than a test report filled with a number of low level command level actions.

Figure 3J:
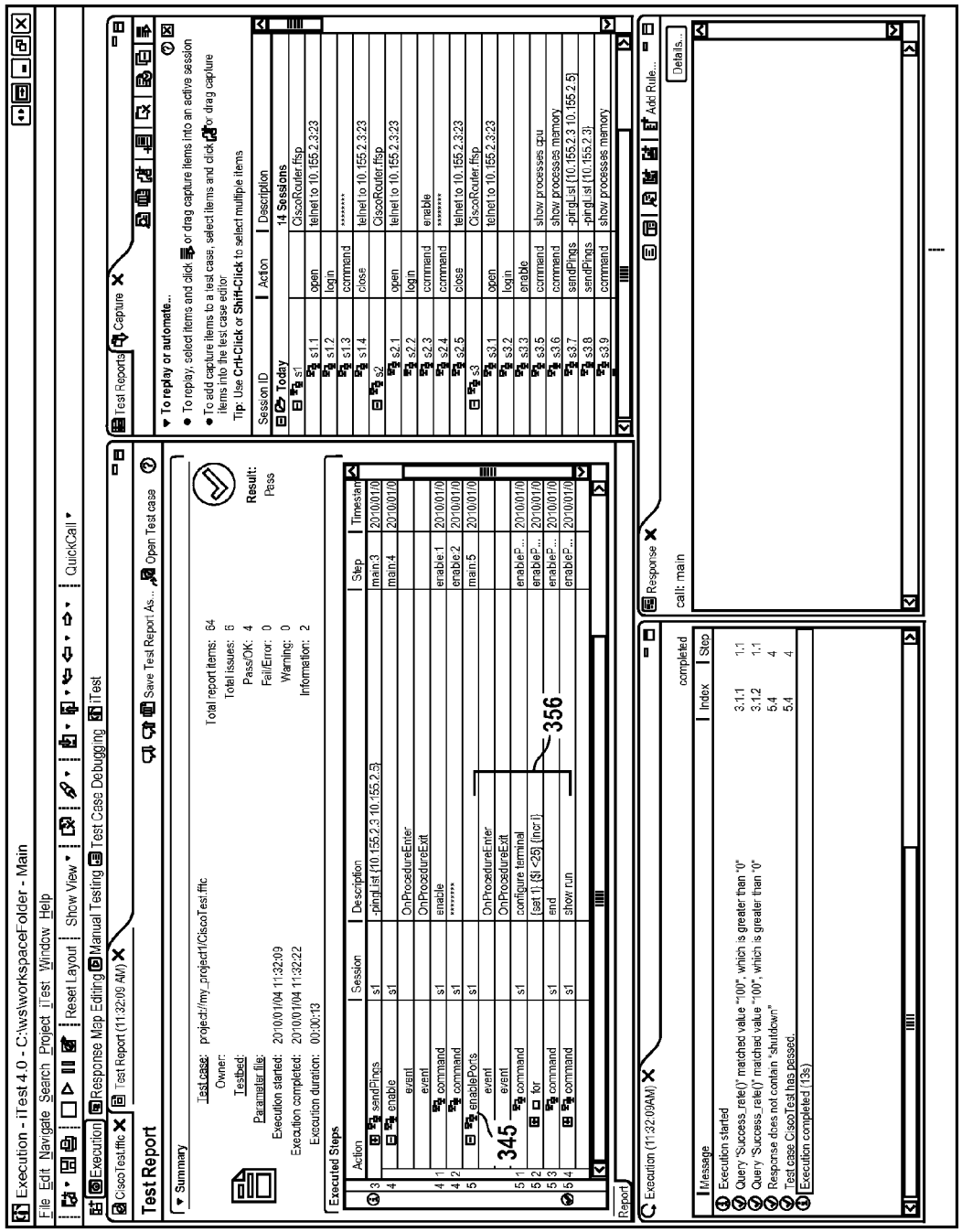
FIG. 3J illustrates an example screenshot of a test report generated as a result of executing a test script with each metaaction expanded to command level actions, according to one embodiment.

FIG. 3J illustrates an example screenshot of a test report generated as a result of executing a test script with each metaaction expanded to command level actions, according to one embodiment. The example screenshot of FIG. 3J shows that the user has the option to expand the views of each executed session class to show all the specific command level actions executed by executing that session class, for a more detailed view of exactly what actions were executed in the test. For example, FIG. 3J shows that the command level actions 356 were executed by calling and executing the "enablePorts" session class procedure 345.

FIG. 4A illustrates the hardware architecture of a SVT system, according to one embodiment. In one embodiment, the testing system 200 is a server computer including components such as a processor 402, a memory 403, a storage device 404, an input module (e.g., keyboard, mouse, and the like) 406, a display module 407, and a communication interface 405, exchanging data and control signals with one another through a bus 401. The storage device 404 is implemented as one or more computer readable storage medium (e.g., hard disk drive), and stores software that is run by the processor 402 in conjunction with the memory 403 to implement the testing system 200 with session classes, session class calls, meta session, and script capturing according to the various embodiments of the present invention as illustrated herein. Operating system software and other application software may also be stored in the storage device 404 to run on the processor 402. Note that not all components of the testing system 200 are shown in FIG. 4A and that certain components not necessary for illustration of the present invention are omitted herein.

Figure 4B:
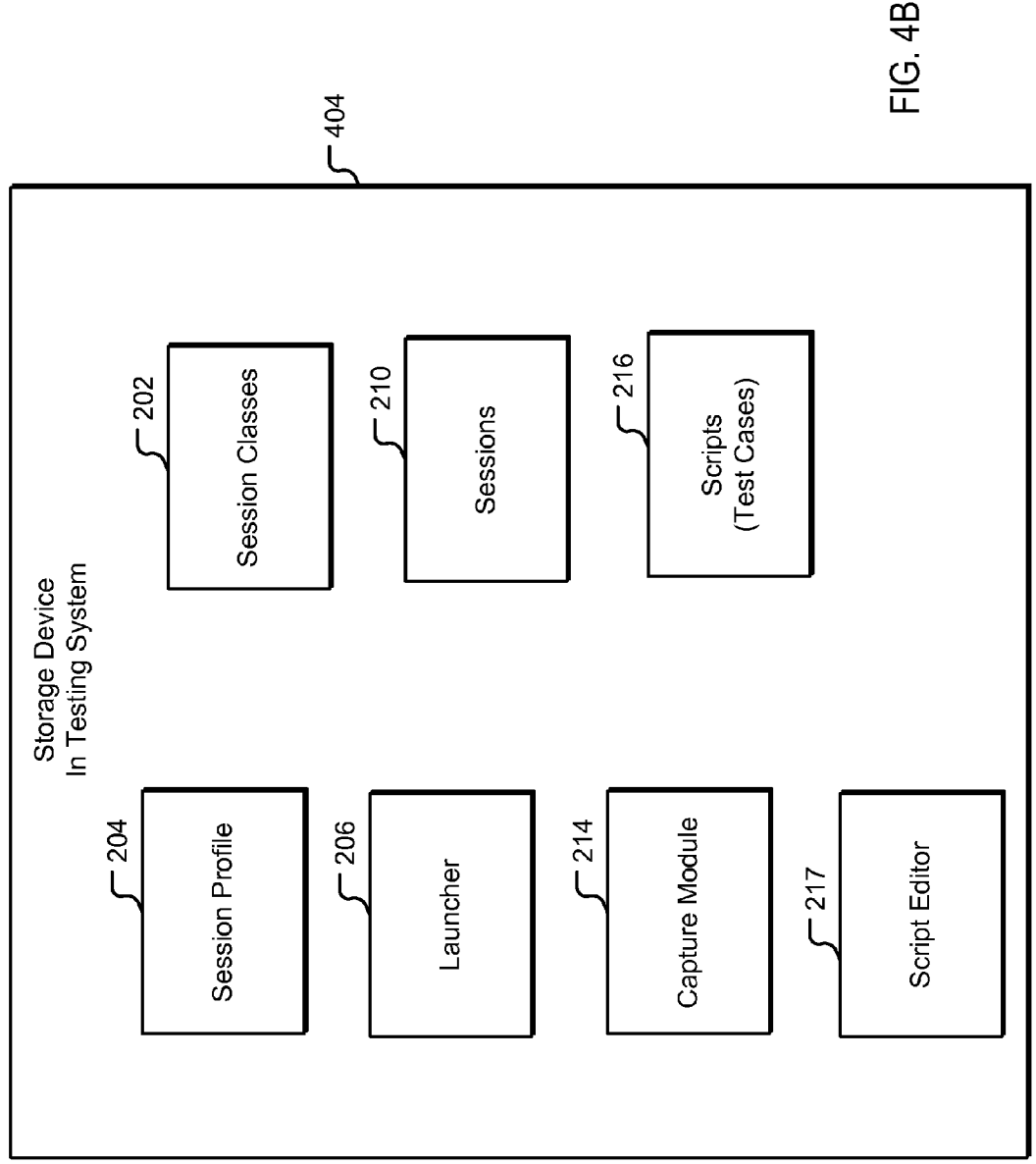
FIG. 4B illustrates the software modules for providing session classes and test capture functionality, according to one embodiment.

FIG. 4B illustrates the software modules for providing session classes and test capture functionality, according to one embodiment. The software modules include session profile 204, session classes 202, launcher 206, sessions 210, capture module 214, script editor 217, and scripts 216, all illustrated above with reference to FIGS. 2A and 2C. These software modules are implemented as computer instructions stored in storage device 404 and are configured to cause processor 402 to operate in accordance with the various embodiments of the present invention as explained herein with respect to each of these software modules. Other SVT software modules (not shown herein) may also be present in the storage device 404.

Upon reading this disclosure, those of skill in the art will appreciate still additional alternative designs for providing and using session classes to run tests or other processes on a device and capturing such session class procedures to generate a test script. Although the session classes invention is described herein in the context of automating test script capturing for system verification tests, the session classes may be used in a similar manner to automate any type of process that is executed using a man-machine interface. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of assisting a user in developing scripts during interactive sessions in which a user directs a test system to interact with a system under test (abbreviated SUT), the method including:
   providing a user interface that controls interaction between the test system and the SUT and development of test scripts for the interaction;
   receiving a designation of a procedure definition or a step within the procedure definition to be developed;
   receiving a plurality of selections from metaactions and command level actions provided in the user interface, wherein the metaactions comprise a plurality of command level actions and the command level actions are commands communicated from the test system to the SUT;
   responding to the designation and selections, including
   executing the selected metaactions or command level actions to produce messages from the test system to the SUT,
   receiving responses from the SUT to the produced messages and
   storing the selected metaactions or command level actions with the designated procedure definition or designated step within the procedure definition; and
   repeating the receiving of the designation, the receiving of the selections, and the responding to the designation and selections to develop a procedure from the procedure definition.

2. The method of claim 1, wherein the metaactions are defined in session classes stored in the test system.

3. The method of claim 2, further comprising receiving selections of session class calls provided in the user interface, wherein the session class calls invoke the metaactions.

4. The method of claim 2, further comprising retrieving and executing a stored procedure definition on the test system, wherein the metaactions are converted to command level actions using definitions of the metaactions in the session classes for execution.

5. The method of claim 1, further including:
   providing a user interface that supports definition of iteration structures within the procedure definition;
   receiving at least one iteration definition; and
   storing the iteration definition.

6. The method of claim 5, wherein the iteration structure iterates over a set of values and causes repeated execution of metaactions or command level actions using particular values in the set of values.

7. The method of claim 5, wherein the iteration structure iterates over an index and causes repeated execution of metaactions or command level actions.

8. The method of claim 1, further including: providing a user interface that supports specification of parameters to the metaactions that are used in producing the messages to the SUT.

9. A computer system including a processor and a computer readable storage medium storing computer instructions configured to cause the processor to perform actions including:
   providing a user interface that controls interaction between the test system and the SUT and development of test scripts for the interaction;
   receiving a designation of a procedure definition or a step within the procedure definition to be developed;
   receiving a plurality of selections from metaactions and command level actions provided in the user interface, wherein the metaactions comprise a plurality of command level actions and the command level actions are commands communicated from the test system to the SUT;
   responding to the designation and selections, including
   executing the selected metaactions or command level actions to produce messages from the test system to the SUT,
   receiving responses from the SUT to the produced messages and
   storing the selected metaactions or command level actions with the designated procedure definition or designated step within the procedure definition; and
   repeating the receiving of the designation, the receiving of the selections, and the responding to the designation and selections to develop a procedure from the procedure definition.

10. The system of claim 9, wherein the metaactions are defined in session classes stored in the test system.

11. The system of claim 10, further configured to cause the processor to perform actions comprising receiving selections of session class calls provided in the user interface, wherein the session class calls invoke the metaactions.

12. The system of claim 10, further configured to cause the processor to perform actions comprising retrieving and executing a stored procedure definition on the test system, wherein the metaactions are converted to command level actions using definitions of the metaactions in the session classes for execution.

13. The system of claim 9, further configured to cause the processor to perform actions comprising:
   providing a user interface that supports definition of iteration structures within the procedure definition;
   receiving at least one iteration definition; and
   storing the iteration definition.

14. The system of claim 13, wherein the iteration structure iterates over a set of values and causes repeated execution of metaactions or command level actions using particular values in the set of values.

15. The system of claim 13, wherein the iteration structure iterates over an index and causes repeated execution of metaactions or command level actions.

16. The system of claim 9, further configured to cause the processor to perform actions comprising providing a user interface that supports specification of parameters to the metaactions that are used in producing the messages to the SUT.

* * * * *